(No Model.)

T. N. SEAY.
COTTON PLANTER.

No. 281,145. Patented July 10, 1883.

WITNESSES:
Otto Beyer
C. Sedgwick

INVENTOR:
T. N. Seay
BY Munn & Co
ATTORNEYS.

UNITED STATES PATENT OFFICE.

THOMAS N. SEAY, OF EASTOVER, SOUTH CAROLINA.

COTTON-PLANTER.

SPECIFICATION forming part of Letters Patent No. 281,145, dated July 10, 1883.

Application filed February 6, 1883. (No model.)

*To all whom it may concern:*

Be it known that I, THOMAS N. SEAY, of Eastover, in the county of Richland and State of South Carolina, have invented a new and Improved Cotton-Planter, of which the following is a full, clear, and exact description.

My invention relates to machines for planting cotton-seed, the arrangement of parts of the machine being such as to particularly adapt it to the planting of unrubbed seed, and to plant the seed at varying distances apart, as desired, the parts being so disposed with relation to each other as shall secure positive movements of the feed-wheel and agitator for securing regularity of action, as hereinafter fully described.

Reference is to be had to the accompanying drawings, forming a part of this specification, in which similar letters of reference indicate corresponding parts in both the figures.

Figure 1:
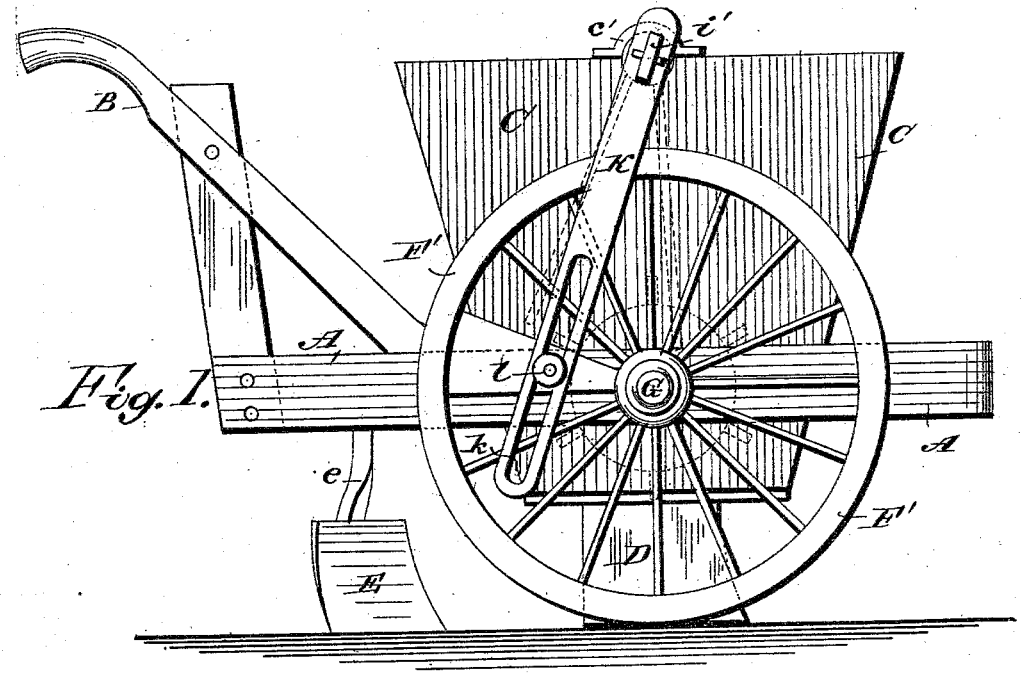
Figure 2:
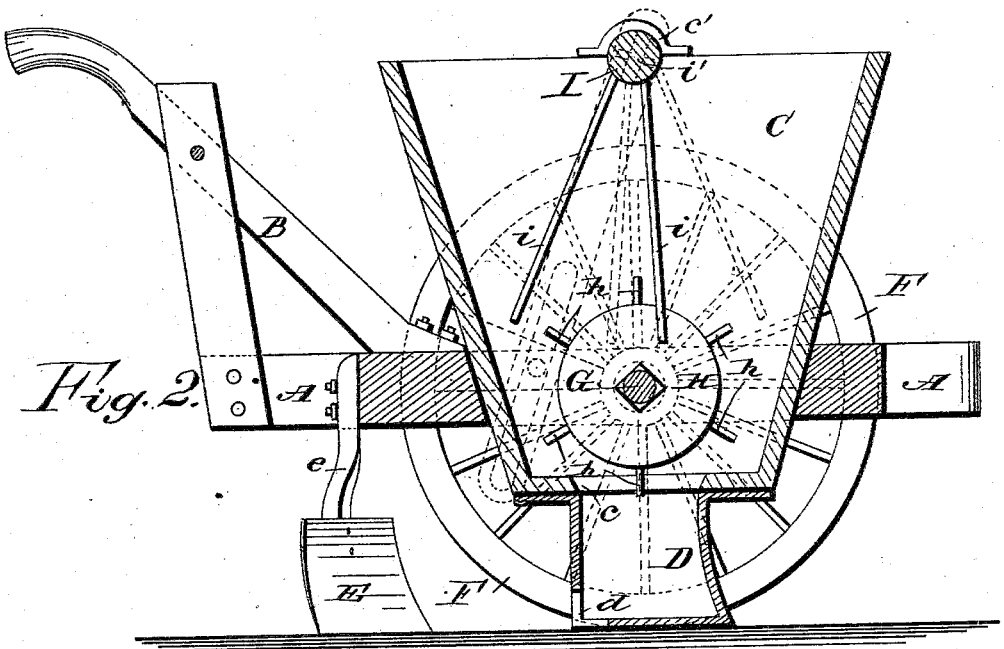

Figure 1 is a side elevation of my improvement, and Fig. 2 is a sectional side elevation thereof.

Upon a strong frame, A, provided with suitably-braced guide-handles B, I mount a hopper, C, carrying the hollow plow-foot D, for opening a furrow, in which to drop from its rear opening, $d$, the seed received from hopper C, the plow D being followed by the covering-plow E, secured adjustably to frame A by standard $e$ in position to throw the soil lifted by plow D back upon the seed deposited in the furrow.

The frame and connected parts above described are suitably supported upon a pair of wheels, F F', wheel F being loose upon its pin or axle G, so that the machine may be turned at the corners of the field and at the ends of the rows without operating the seed-agitator and feeding mechanism next described.

To the axle G, above feed-slots $c$ in the bottom of hopper C, is secured the feed-wheel H, to revolve with the axle, and carrying radial pins or arms $h$, to detach the seeds from the loosened mass in the bottom of the hopper and carry them through slots $c$—which slots in practice are to be adjustable as to size—into the plow D, to be deposited in the furrow and covered, as above described. The feed may be regulated to drop the seed at greater or less distances apart by removing pins $h$ from or adding them to the number in use in the feed-wheel, and for thoroughly loosening the mass of seed in the hopper about the feed-wheel. To prevent clogging of the wheel and promote its regular action, I employ the agitator I, consisting of arms or whip-sticks $i$, pendent from a shaft, $i'$, fitted in bearings $c'$ at the sides of the hopper, to be rocked by arm K, fixed to shaft $i'$, and having a long slot, $k$, for engaging a stud, $l$, fixed to wheel F, so that, as said wheel revolves as the machine advances, the stud $l$ will move up and down slot $k$ to rock-shaft $i'$, for imparting the necessary swing to arms $i$ for loosening the seed about the feed-wheel H, so that it may act to drop the seed without damage to its teeth.

Thus constructed, the machine is well suited to its work, and, by reason of its effectiveness in planting unrubbed seed, makes a large saving in use over the planting of seed by machines which first require the seed to be hand-rubbed, as will be readily understood; and the connections for driving the feed-wheel and agitator are of a character to secure their positive action without slip, resulting in uniformly-distanced planting of the seed without waste.

Having thus described my invention, I claim as new and desire to secure by Letters Patent—

1. As a means for positively rocking the agitator I within the hopper of a cotton-seed planter, the bar K, slotted at $k$ and engaging stud $l$ of wheel F', substantially as shown and described.

2. The combination, in a cotton-seed planter, of feed-wheel H, fixed to axle G, having wheel F', fitted to turn with the axle, and the agitator I, rocked within the hopper by slotted bar K, and a pin, $l$, attached to the fixed wheel, whereby the feed-cylinder and agitator shall be positively worked at the same time by the advance of the machine, as set forth.

THOMAS N. SEAY.

Witnesses:
C. B. COBURN,
GEO. M. DRAFTS.